T. C. WILSON.
COMBINED SEED PLANTER AND FERTILIZER DISTRIBUTER.
APPLICATION FILED DEC. 8, 1911.
1,099,782.
Patented June 9, 1914.
2 SHEETS—SHEET 1.
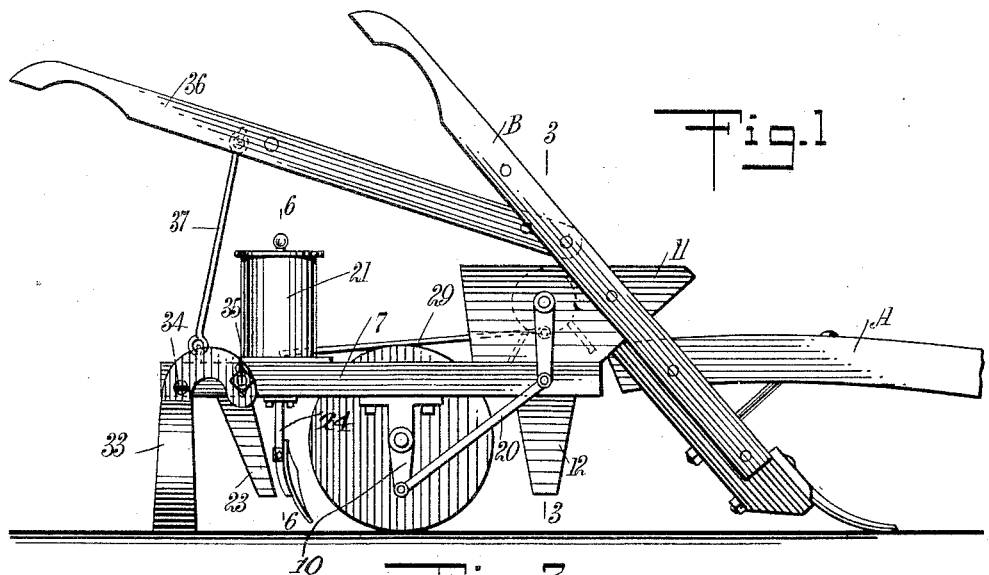
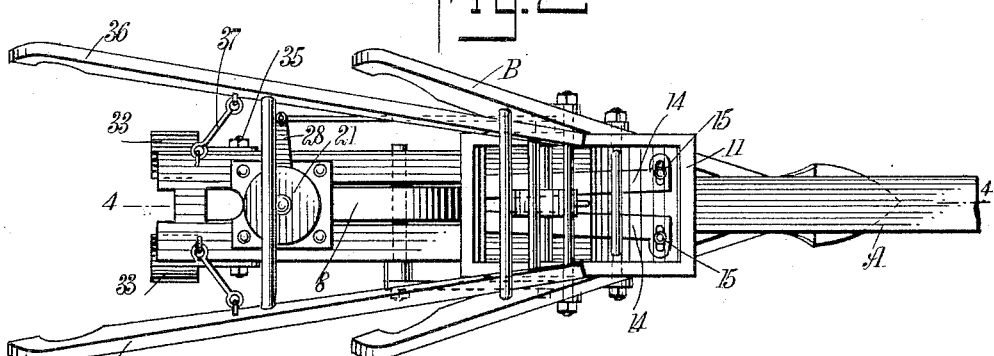
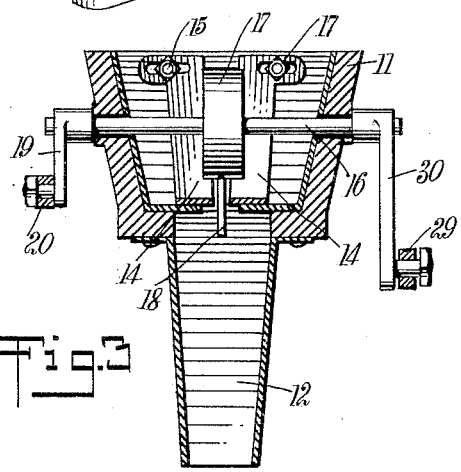
WITNESSES
INVENTOR
Thomas C. Wilson
BY
ATTORNEYS

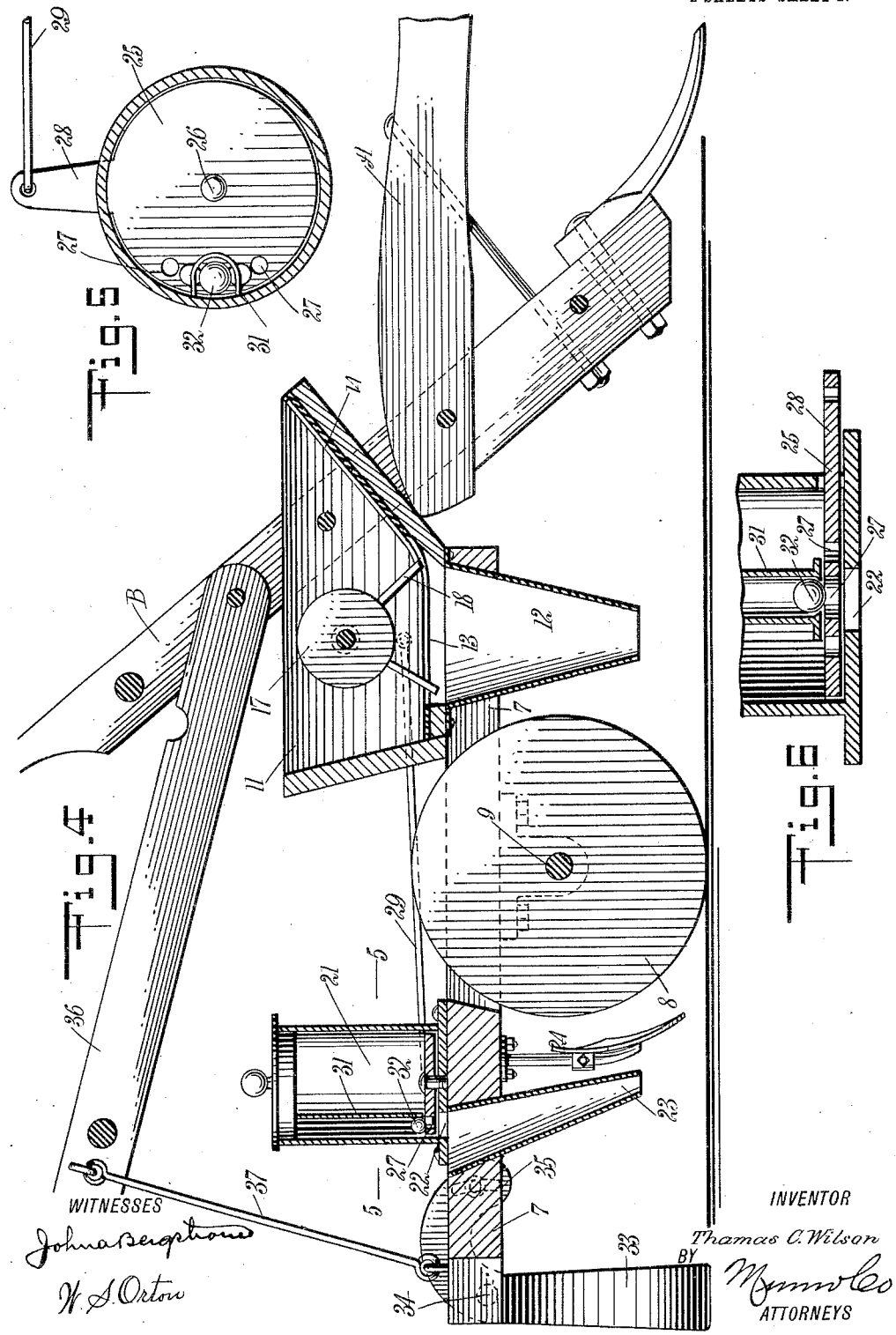

UNITED STATES PATENT OFFICE.

THOMAS CLINTON WILSON, OF HARMS, TENNESSEE.

COMBINED SEED-PLANTER AND FERTILIZER-DISTRIBUTER.

1,099,782.  Specification of Letters Patent.  Patented June 9, 1914.

Application filed December 8, 1911. Serial No. 664,566.

*To all whom it may concern:*

Be it known that I, THOMAS CLINTON WILSON, a citizen of the United States, and a resident of Harms, in the county of Lincoln and State of Tennessee, have invented a new and Improved Combined Seed-Planter and Fertilizer-Distributer, of which the following is a full, clear, and exact description.

My invention relates to a combined seed planter and fertilizer distributer, in which the fertilizing substance is distributed, the seed furrows formed, and the seeds planted and covered in the one operation of plowing the ground.

An object of my invention is to provide a device of the above indicated character, which may be readily attached to a plow of any standard construction; which will uniformly distribute the fertilizer on the plowed ground, and which will automatically feed the seed into a progressively formed seed furrow and will cover the seed so deposited.

I attain the above-outlined object by constructing a frame mounted on a suitable wheel, by mounting on this frame, a hopper containing the fertilizer, which hopper also contains means for feeding the fertilizer through a funnel, by positioning in rear of the hopper, a seed receptacle having means for regulating the feeding of the seed in rear of a furrow-forming member, and by following the seed funnel with a covering member.

Reference is to be had to the accompanying drawings, forming a part of this specification, in which similar characters of reference indicate corresponding parts in all the figures, and in which—

Figure 1 is a side elevation showing a preferred embodiment of my invention; Fig. 2 is a plan view looking down upon the device; Fig. 3 is a transverse sectional view taken through the device at the fertilizing hopper and on the line 3—3 of Fig. 1; Fig. 4 is an enlarged longitudinal sectional view taken on the line 4—4 of Fig. 2; Fig. 5 is a transverse sectional view taken on the line 5—5 of Fig. 4, looking downward on the seed receptacle, and Fig. 6 is a fragmentary vertical sectional view taken on the line 6—6 of Fig. 1.

In the several figures, I have shown a bull tongue plow A, having the conventional form of handles B, disposed between which handles and resting upon the beam of the plow, is my improved seeder and distributer C more particularly forming the subject-matter of my invention.

The combined seeder and distributer comprises a horizontally-disposed frame 7, supported from the ground by means of a wheel 8 and journaled within the frame 7, the axle 9 of which wheel has attached thereto, an arm 10, by means of which motion is conveyed to distributing mechanism hereinafter described. Mounted upon the forward end of the frame 7 and in advance of the wheel 8, is a hopper 11, adapted to contain the fertilizing substance, which substance is fed through the hopper by a distributing funnel 12 positioned therebelow. To regulate the feed of the fertilizer through the funnel, there is disposed on opposite sides of the aperture 13 in the bottom of the hopper, a pair of parallelly disposed spaced-apart plates 14, which plates may be spaced apart different distances and are held in their spaced position by means of slot-and-bolt connections 15.

Mounted transversely of the hopper, is a shaft 16, rigidly and centrally mounted upon which shaft is a disk 17, having projecting fingers 18 extending therefrom and adapted to pass through the opening formed between the plates 14, whereby the fertilizing substance is fed through the opening 13 and funnel 12 to the ground. This shaft 16 is actuated by means of a crank 19, rigidly connected to one end of said shaft, exteriorly of the hopper 11, to which crank is pivoted one end of a reach arm 20, the opposite end of which is pivoted to the arm 10 actuated by the rotation of the wheel 8.

Mounted upon the frame 7, in rear of the wheel 8, is a seed receptacle 21, adapted to contain the seed, which seed will pass through an opening 22 in the bottom thereof, and through a seed chute 23, which chute is disposed in rear of a mixing plow 24 rigidly attached to the frame 7. Pivotally mounted in the bottom of the seed receptacle 21, is a false bottom 25 fastened to the receptacle by means of a centrally-disposed stud 26, said bottom 25 having adjacent its periphery and to one side of the stud 26, a series of apertures 27 disposed above the opening 22. It will be noted that the false bottom 25 may be oscillated to successively bring the apertures 27 into alinement with the opening 22, to feed the seed through the chute 23 to the ground. This oscillation is effected by means of a connection with the shaft 16, said connection comprising a projection 28, extending out through a slot in the side of the seed receptacle 21, to which extension is connected one end of a reach rod 29, the opposite end of which is pivoted to a crank 30, rigidly mounted upon the shaft 16, exteriorly of the hopper 11 and on the end of the shaft opposite the end to which the crank 19 is attached.

Rigidly mounted upon and extending from the inside of the wall of the receptacle 21, and positioned above the opening 22, is a substantially U-shaped guideway 31, within which guideway is positioned a heavy ball 32, which ball is adapted to press upon the grain of seed in the aperture 27, to force the same through the opening 22 into the chute 23. In the rear of the seed chute 23, is disposed a pair of transverse, spaced-apart seed coverers 33 of the general inverted substantially L-shape, pivoted to the end of the frame 7, at its angle, by means of pins 34. The upper vertical arm of each of the coverers extends along the side of the rear of the frame 7, and is adjustably fastened to said frame by means of a bolt-and-slot connection 35, whereby the angular disposition of the coverer with reference to the frame 7 may be varied.

The device may be guided by means of a pair of handle bars 36, having their forward ends removably connected to the handles of the plow beam, and connected intermediate their length by means of a link rod 37 to the rear of the frame 7.

Having thus described my invention, I claim as new and desire to secure by Letters Patent:

1. The combination with a plow comprising a standard beam and handles, of a planter comprising a frame, means for securing the front end of the frame to the handles of the plow standard, a supporting wheel mounted in the frame intermediate of the ends thereof, a seed receptacle on the frame in rear of the wheel, a feeding device in the receptacle, means for operating the feeding device from the wheel, a coverer at the rear end of the frame, handles secured to the handles of the plow standard, and rods secured to the said handles and to the rear of the frame.

2. A planter attachment for plows, comprising a frame adapted to have its front end secured to a plow at the rear thereof, a supporting wheel mounted in the frame intermediate of its ends, a seed receptacle on the frame in rear of the supporting wheel, a discharge chute carried by the frame below the receptacle, a feeding device in the receptacle, means for operating the feeding device from the wheel, a plow in front of the discharge chute of the receptacle, an adjustable coverer at the rear of the frame, handles adapted to be secured to the plow handles, and rods connecting the said handles with the rear end of the frame.

3. In a planter attachment for plows, a frame adapted to be secured to a plow at the rear thereof, a supporting wheel mounted in the frame approximately at its center of length, a seeder mounted on the rear part of the frame, means for operating the seeder from the wheel, handles adapted to be secured to the plow handles, and rods connecting the said handles with the rear part of the frame.

In testimony whereof I have signed my name to this specification in the presence of two subscribing witnesses.

THOMAS CLINTON WILSON.

Witnesses:
J. W. HOLMAN,
MATTIE GILES.

---

Copies of this patent may be obtained for five cents each, by addressing the "Commissioner of Patents, Washington, D. C."